(12) United States Patent
Mischi (10) Patent No.: US 11,577,113 B2
(45) Date of Patent: Feb. 14, 2023

(54) SELF-POWERED, MECHANICALLY-ISOLATED/DECOUPLED VIBRATION MECHANISM FOR BICYCLE PEDALS

(71) Applicant: HIPERMOTION B.V., Eindhoven (NL)

(72) Inventor: Massimo Mischi, Eindhoven (NL)

(73) Assignee: HIPERMOTION B.V., Eindhoven (NL)

( * ) Notice: Subject to any disclaimer, the term of this patent is extended or adjusted under 35 U.S.C. 154(b) by 41 days.

(21) Appl. No.: 17/053,427

(22) PCT Filed: May 14, 2019

(86) PCT No.: PCT/EP2019/062298
§ 371 (c)(1),
(2) Date: Nov. 6, 2020

(87) PCT Pub. No.: WO2019/219653
PCT Pub. Date: Nov. 21, 2019

(65) Prior Publication Data
US 2021/0228929 A1    Jul. 29, 2021

Related U.S. Application Data

(60) Provisional application No. 62/671,134, filed on May 14, 2018.

(51) Int. Cl.
*A63B 21/005*    (2006.01)
*A63B 24/00*    (2006.01)
(Continued)

(52) U.S. Cl.
CPC .... *A63B 21/00196* (2013.01); *A63B 21/0055* (2015.10); *A63B 21/0058* (2013.01);
(Continued)

(58) Field of Classification Search
None
See application file for complete search history.

(56) References Cited

U.S. PATENT DOCUMENTS 6,039,679 A  *  3/2000  Yu .................... A63B 21/00196
                                                        482/110
6,104,096 A  *  8/2000  Hicks ........................ B62J 6/14
                                                        290/1 R
(Continued)

FOREIGN PATENT DOCUMENTS

CN    203915377 U  * 11/2014
CN    106166365    * 11/2016  ............. A63B 22/02
(Continued)

OTHER PUBLICATIONS

International Search Report and Written Opinion in corresponding International Application No. PCT/EP2019/062298 dated Jun. 25, 2019.

*Primary Examiner* — Sundhara M Ganesan
*Assistant Examiner* — Shila Jalalzadeh Abyaneh
(74) *Attorney, Agent, or Firm* — Steven M. Koehler; Westman, Champlin & Koehler, P.A.

(57) ABSTRACT

A self-powered vibration mechanism is provided that can be mounted on an existing pedal shaft yet operates independent from the existing pedal. Mechanical isolation or mechanical decoupling permits transferring the vibrating energy to the foot rather than to the pedal shaft and the bicycle. In another embodiment, a full removable pedal with self-powered vibration mechanism can replace an existing pedal.

20 Claims, 6 Drawing Sheets

(51) Int. Cl.
*B62M 3/08* (2006.01)
*A63B 21/00* (2006.01)
*A63B 22/00* (2006.01)
*A63B 22/06* (2006.01)
*B62M 3/16* (2006.01)

(52) U.S. Cl.
CPC ...... *A63B 22/0046* (2013.01); *A63B 22/0605* (2013.01); *A63B 24/0087* (2013.01); *B62M 3/08* (2013.01); *B62M 3/16* (2013.01); *A63B 2209/00* (2013.01); *A63B 2220/833* (2013.01); *A63B 2230/06* (2013.01)

(56) References Cited

U.S. PATENT DOCUMENTS 7,137,929 B2 11/2006 Fan
9,278,249 B2 3/2016 Watterson
2007/0270726 A1* 11/2007 Chou ............... A63B 21/00069
   601/69
2012/0142496 A1* 6/2012 Tsarpela ........... A63B 21/00196
   482/1
2014/0024502 A1* 1/2014 Watterson .......... A63B 22/0605
   482/57
2015/0023033 A1* 1/2015 Kuo .......................... B62J 6/26
   362/473

FOREIGN PATENT DOCUMENTS

| CN | 106166365 A | * | 11/2016 | ............ A63B 22/02 |
| DE | 202006007325 | | 9/2006 | |
| DE | 102017223085 A1 | * | 6/2019 | |
| EP | 1053167 | | 11/2000 | |
| JP | 3186980 | | 10/2013 | |
| KR | 20150092517 A | * | 8/2015 | ............ A63B 23/04 |
| WO | WO2010005286 | | 1/2010 | |

* cited by examiner

SELF-POWERED, MECHANICALLY-ISOLATED/DECOUPLED VIBRATION MECHANISM FOR BICYCLE PEDALS

CROSS-REFERENCE TO RELATED APPLICATIONS

This application is a 371 of PCT application PCT/EP2019/062298 filed May 14, 2019. PCT application PCT/EP2019/062298 claims the benefit of U.S. Provisional application 62/671,134 filed May 14, 2018.

FIELD OF THE INVENTION

This invention relates to vibration mechanisms for bicycle pedals.

BACKGROUND OF THE INVENTION

A widespread vibration system for muscular training and conditioning is the so-called Whole Body Vibration (WBV). In WBV, as the name implies, the entire body is exposed to vibration. This as opposed to local muscle vibration where an isolated muscle group is stimulated. WBV is carried out by using a vibrating platform of sorts on which exercises can be performed. Through the vibration of the platform there is a transfer of energy to the body of the person performing the exercises. The extent (amplitude), direction (shape) and frequency of the vibration determine the effect on the human body. Different vibrating devices have varying vibration characteristics and therefore range greatly in effectiveness.

WBV systems are aimed at inducing stretch reflex in a muscle, resulting in maximum training effect; to this end, the upward direction of the vibration is the most important. The most commonly used devices operate in three directions; sideways (x), forwards and backwards (y) and up and down (z). The z-direction has the greatest range of motion and is the determining factor for generating muscle contractions.

The mechanically induced stimulation forces the body into an acceleration. As a result, the muscle is stretched and this is detected by a small organ in the muscle, the so-called muscle spindle (muscle receptor). The muscle spindle generates a stretch-related signal that is used to adjust the motor neuron drive and resulting muscle tension in a feedback loop fashion through the spinal cord. Besides the muscle spindles, additional receptors located in the muscle tendon (Golgi tendon organs) have a similar function. All together, they contribute to the so-called stretch reflex, an involuntary mechanism aimed at adjusting the muscle tension to load variations. Indeed, despite some involvement (modulation) of the central neural system, these mechanisms are essentially involuntary. In the case of vibrations, neuromuscular reflex also aims at stiffening the joint in order to stabilize it against vibration. This specific mechanism, referred to as "tonic vibration reflex", seems to contribute to a large extent to the benefits ascribed to WBV. Electromyography (EMG) has extensively been used in order to characterize these complex reflex mechanisms by measuring the resulting electrical activity in the muscle.

It has been shown that vibration training causes increased myoelectric activity and fatigue by overstimulation of neuromuscular reflex mechanisms, thus creating an opening for the development of specific training programs.

Immediate and Short-Term Effects of WBV

Because more muscle fibers (clustered in so-called motor units) are recruited under the influence of vibration compared to normal voluntary muscle contractions, the muscles are more efficiently stimulated.

The direct consequence of WBV is that muscles can be used more quickly and actively. As a result, they can produce more power and explosive force. It is noted that this process only works if the stimulation is for brief periods of time and too intense. Over stimulation will cause muscle fatigue and reduce the effect of vibration.

Another direct effect of WBV is enhanced blood circulation (muscle perfusion). The fast contraction and relaxation of muscles (up to 30-50 times per second) works as a natural pump for the blood vessels and the lymph vessels. This increases the rate at which the blood flows through the body. This is often experienced as a tingling, prickling, warm sensation on the skin. Vasodilatation (widening of vessels) can result from vibration, which has been confirmed by studies involving infrared spectroscopy.

Together with an increase in muscle perfusion, an increased glucose uptake in the muscle has been shown, particularly suitable to decrease blood sugar levels in some type of diabetes patients.

Increased co-activation of antagonist muscles has also been measured during vibration exercise. Indeed, improved muscle coordination and balance has also been demonstrated as a result of increased neural excitability, resulting in improved stabilogram after WBV exposure.

Long-Term Effects of WBV

For the long-term effects to take place on the body, there must be muscle fatigue or a mild form of stress induced in the muscular system. These effects are known as super compensation. Just as with other forms of training, the body enters a state of supercompensation after repeated, increasing strain. The principle of supercompensation is based on the adaptive nature of the human body. If conditions become increasingly difficult, the body slowly adapts to the new situation and performance is increased.

These effects for WBV training have been shown for all ages. During a placebo-controlled study a significant improvement in isometric, dynamic and explosive strength was measured in the WBV group, while the placebo group showed no improvement. This proves the added value of vibration on the performance of static exercises.

Studies of the structural effects of vibration training have shown that the strength increase through a WBV training program is at least comparable to the increase in strength that can be achieved through conventional forms of training. Indications are that results are even better in explosive strength (power) when comparing WBV to conventional training.

Another important difference between conventional training methods and WBV is in that the stress on the human body can be kept low as the neuromuscular reflex loops stimulated by WBV induce higher levels of muscle activation, overcoming the need additional loads and weights. These are required in conventional training methods to achieve effective muscle conditioning at submaximal intensity.

This feature makes WBV perfect for people who are otherwise restricted in conventional training methods due to age, illness, obesity or weak muscles. On the other hand, it is also very suitable for (professional) athletes who can enhance their performance by optimal stimulation of neuromuscular reflex at specific vibration amplitudes and frequencies.

In addition to the effects on muscle development, WBV has a positive effect on bone density. The vibration causes shear and compressional stress of bone material which stimulates the activation of osteoblasts (bone forming cells) whilst reducing the activity of osteoclasts (bone decay). Repeated stimulation of the bone system, in combination with a higher tensile strength of the muscles on the bone, will over time result in increased bone density. It is also very likely that the improved blood flow and the related "bone perfusion" ensure a better supply of nutrients that are also better able to penetrate into the bone tissue.

Vibration training also plays a role in the prevention of accidents and the associated bone fractures. The increase in bone density, increase in muscle strength, postural control and balance results in fewer bone fractures. For elderly all of these factors can be improved with vibration training.

The present invention advances the art by providing a self-powered vibration device.

SUMMARY OF THE INVENTION

A self-powered vibration mechanism is provided that can be mounted on an existing pedal shaft yet operates independent from the existing pedal. Mechanical isolation or mechanical decoupling permits transferring the vibrating energy to the foot rather than to the pedal shaft and the bicycle. In another embodiment, a full removable pedal with self-powered vibration mechanism can replace the existing pedal.

In one example, the self-powered vibration device is a self-standing device that is adapted to be integrated with a cycling pedal. In another example, the self-powered vibration device and the cycling pedal are an integral unit, e.g. a cycling pedal unit. The cycling pedal unit, as a single unit, has a cycling pedal and a self-powered vibration device to mechanically vibrate a body part of a person cycling using the cycling pedal. The self-powered vibration device is mechanically isolated and decoupled by mechanical isolation mounts from the cycling pedal.

The self-powered vibration device in one embodiment has an electrical generator with a rotatable generator shaft. The rotatable generator shaft rotation is driven by a rotation of a cycling pedal. The rotatable generator shaft rotation generates power for the electrical generator.

The self-powered vibration device further has an electrical motor powered by the electrical generator. The electrical motor produces a rotation of an eccentric shaft. In one example, the electrical generator is mounted on the cycling pedal.

The self-powered vibration device further has a vibration plate that is mechanically vibrated by the rotation of the eccentric shaft. The mechanical vibration is transmitted from the eccentric shaft via a vibration transmission element to the vibration plate. The vibration transmission element is made of stiff material to minimize vibration damping. The vibration plate is mechanically isolated and decoupled by mechanical isolation mounts from the cycling pedal. It is the vibration plate that is capable of mechanically vibrating a body part of a person while in contact with the vibration plate. In one example, the mechanically vibrations of the body part of the person are in the order of 20-50 Hz.

In another embodiment, the self-powered vibration has a control unit to control the rotation speed of the eccentric shaft produced by the electrical motor based on physiological parameters measured by one or more sensors.

In still another embodiment, the self-powered vibration device has one or more sensors to measure physiological parameters from the person. The one or more sensors control the mechanically vibrations of the body part of the person. Examples of physiological parameters are heart rate, pulse rate, as well as muscle force, perfusion and electromyographic activity.

In still another embodiment, the self-powered vibration device has a gear system configured to determine the respective rotation speed(s).

In still another embodiment, the rotation of the eccentric shaft is adjusted through a motor-driver control unit. In one example, the rotation of the eccentric shaft is adjusted through a pulse-width modulation.

In still another embodiment, the self-powered vibration device has one or more gears to adjust rotation speeds and therewith the mechanical vibration frequency.

In still another embodiment, the implementation of the device can make use of electromagnetic, magnetic, or mechanical power generated by the spinning rotation of the pedal. Vibrating oscillations can then be generated exploiting the action of eccentric rotation, attractive-repelling magnetic force, or magnetic braking depending on the preferred vibrating action.

Different from standard vibration devices, such as WBV devices, the device of the present invention is integrated in a bicycle pedal, making the WBV benefits available to any person who uses a bicycle. Being self-powered, the pedal is plug and play, and does not require any additional modification to the bicycle.

The invention allows efficient conditioning of the leg muscles of cycling people through neuromuscular reflex mechanisms stimulated by the self-powered vibration device. Conditioning involves improvement in muscle force and power, as well as increase in muscle perfusion, glucose uptake, and coordination. The latter is particularly relevant for improved balance control and fall prevention in the elderlies. Especially in the elderly population, the use of vibrations produces additional important benefits by increase of bone density, opposing bone degeneration processes associated with ageing.

DETAILED DESCRIPTION

A self-powered vibration device is defined as a device where the power to run the vibration component of the device originates from the activity performed by the person receiving the vibration. In a specific exemplary embodiment of this invention a bicycle pedal's rotation generated by a person pedaling generates the power for the vibration device.

In one embodiment, the self-powered vibration mechanism can be mounted on an existing pedal shaft yet operates independent from the existing pedal. Mechanical isolation or mechanical decoupling permits transferring the vibrating energy to the foot rather than to the pedal shaft and the bicycle. In another embodiment, a full removable pedal with self-powered vibration mechanism can replace the existing pedal.

The implementation of the device can make use of electromagnetic, magnetic, or mechanical power generated by the spinning rotation of the pedal. Vibrating oscillations can then be generated exploiting the action of eccentric rotation, attractive-repelling magnetic force, or magnetic braking depending on the preferred vibrating action.

Embodiments of the invention aim at embedding WBV concepts in a bicycle pedal, such that no external power source is necessary. It is noted that if the person is pedaling then such action could be regarded as external power, however, with no external power for the purposes of this invention it is meant to say no external power device instead of human power source. Embodiments of the invention, referred to as self-powered vibration device, can either be added to existing pedals if the pedal is not part of the self-powered vibration device, or if the pedal is part of the self-powered vibration device one could simply replace the pedals of any existing device without need for any additional modification.

Key to the invention is the use of the spinning rotation of the pedal about its axis to generate sufficient power to produce oscillating vibrations. Effective transmission of these vibrations to the foot are obtained by mechanically isolating (decoupling) the pedal shaft from the vibrating element, which is instead mechanically connected to the foot plate. Several embodiments are envisaged to generate vibrations.

Figure 1:
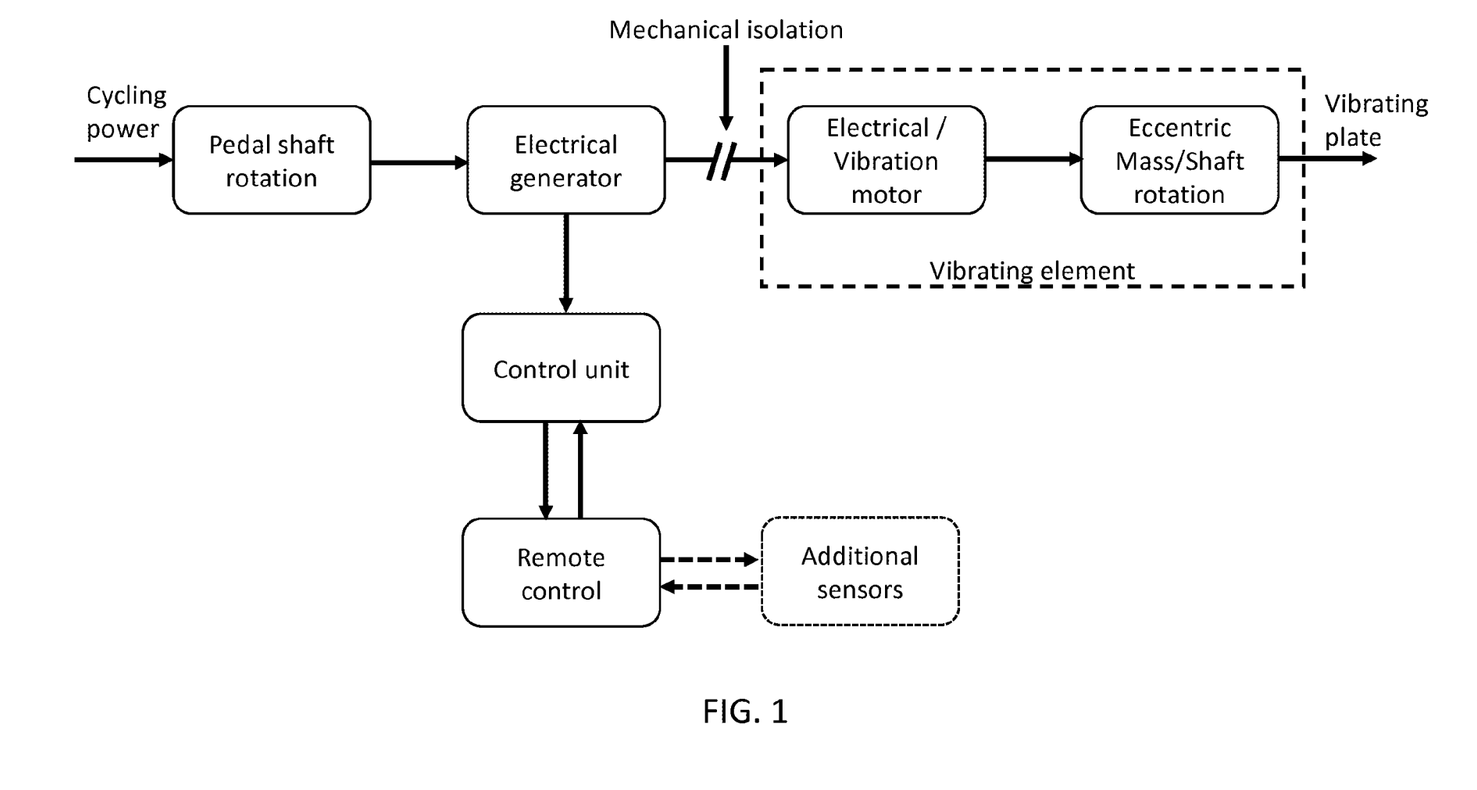
FIG. 1 shows the concept of a self-powered vibration device according to an exemplary embodiment of the invention.
Figure 3:
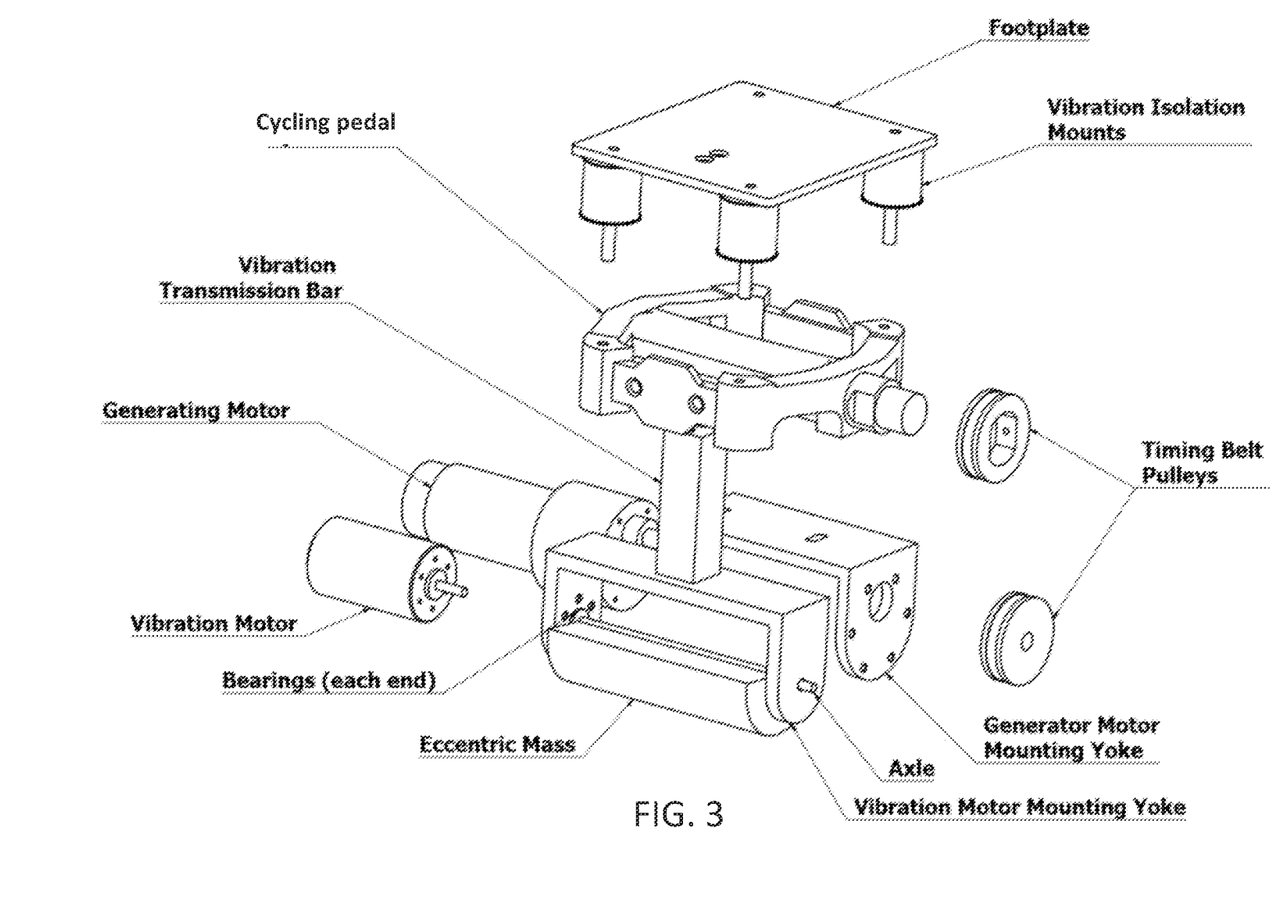
FIG. 3 shows an exploded view of a self-powered vibration device according to an exemplary embodiment of the invention.

FIG. 1 shows a conceptual schematic of an embodiment, where the self-powered vibration mechanism is integrated in an existing pedal. The cycling power generates relative rotation of the pedal shaft with respect to the pedal, which can be used to actuate an electrical generator. This powers an electrical motor which generates vibrations by rotating an eccentric shaft. The vibrating element (defined in FIG. 1 as an electrical motor and an eccentric shaft; electrical motor in FIG. 3 is referred to as vibration motor) is mechanically isolated or decoupled from the original pedal and pedal shaft, while it is directly connected to a vibrating plate which is directly underneath the foot. This way, effective mechanical transmission of the generated vibration is obtained to the foot, while minimizing any vibration energy loss to the mechanical structures of the bike. The spinning rotation of the eccentric mass can be adjusted through a motor-driver control unit by e.g. PWM (pulse width modulation) technology. Remote control of the speed, leading to vibrations in the order of 20-50 Hz, can also be envisaged through e.g. communication via Wi-Fi or Bluetooth with a smartphone. Similarly, the use of on-body sensors can also be envisaged in order to dynamically adjust the vibration frequency.

Lower frequencies can be adopted to reach distant muscles (e.g., leg extensors) whose stimulation can be adjusted by sensing the degree of muscle fatigue. To this end, EMG sensors as well as pressure sensors embedded in the pedal can be employed. Sensors for heart-rate monitoring by either electrocardiography or photoplethysmography can also be used to assess the degree of effort and central fatigue, and consequently adjust the vibration frequency to optimally stimulate different muscles. To this end, dedicated control loops can be implemented in the motor-driver control unit that translate the estimated sensor parameters into spinning frequency.

Figure 2:
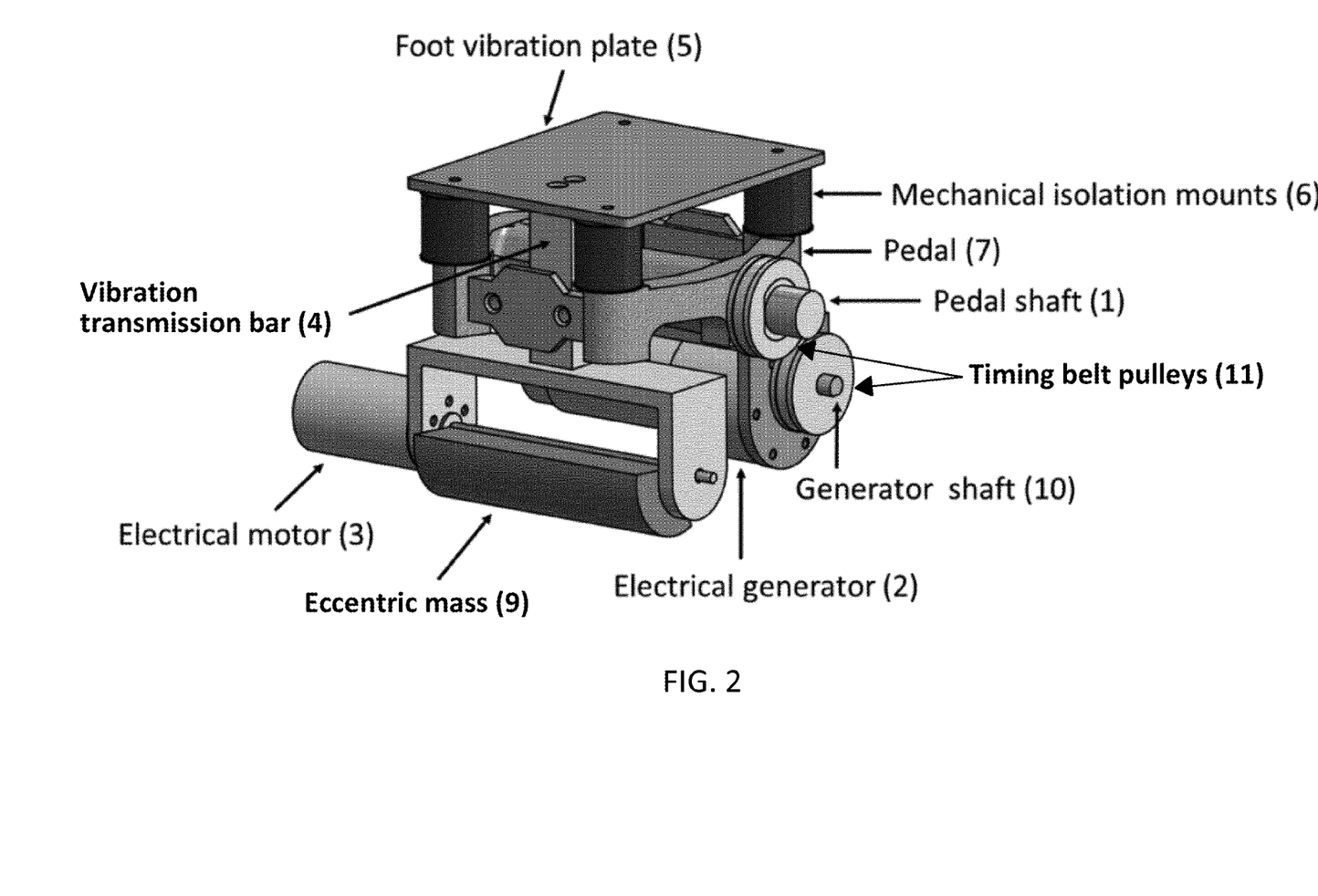
FIG. 2 shows a self-powered vibration device according to an exemplary embodiment of the invention.

FIG. 2 shows a self-powered vibration mechanism integrated with an existing pedal 7. The spinning rotation of pedal 7 about its own shaft 1 can be used through timing belt pulleys to rotate generator shaft 10 of an electrical generator 2 that is mounted on pedal 7.

The electrical generator 2 powers an electrical (vibration) motor 3 that produces the spinning rotation of an eccentric shaft 9. Such rotation generates vibrations that are mechanically transmitted to the foot via a vibration transmission element 4 directly connected to the foot vibration plate 5. Transmission element 4 is made of stiff material to minimize vibration damping. Instead, the foot vibration plate 5 is mechanically isolated (decoupled) from pedal 7 and pedal shaft 1 via mechanical isolation mounts 6. Mechanical isolation or decoupling permits enhancing the efficiency of the vibration transmission to the foot by minimizing the transmission (loss) of vibration energy to the bicycle frame via the pedal. As a skilled artisan would readily appreciate, different types of vibration (vertical, circular, transversal) in different directions can be transmitted by different isolation mounts and isolation-mount geometries.

The eccentric mass can be realized by using high-density material, such as metal. Depending on the adopted isolation, a mass in the range of 100-300 gram is sufficient to generate vibration displacements in the range 0.3 to 1 mm, which is sufficient for effective stimulation of the leg muscles. The frequency should at least cover the range 20-40 Hz. Higher and lower frequencies have been proven less effective to stimulate neuromuscular reflex mechanisms. The rotation of multiple eccentric masses can be used to modify the vibration direction and balance the system.

FIG. 3 is an exploded view of the separate elements of the self-powered, mechanically-isolated/decoupled vibrating pedal as shown in FIG. 2 evidencing how these elements work independently and how they can be mounted on an existing pedal. The Generator motor mounting yoke holds the Generating motor fixed to the Cycling pedal while two Timing belt pulleys are used to accommodate a transmission belt and transfer the rotation of the pedal shaft to the Generating motor. The electrical current produced by the Generating motor is used to drive the Vibration motor, which is fixed to the Vibration motor mounting yoke. The Vibration motor mounting yoke supports and facilitates the rotation of the motor shaft (Axle) by the Bearings fixed on each end. Through these bearings, the force generated by the spinning Eccentric mass connected to the Axle is transferred via the Vibration transmission bar to the Footplate, which is mechanically isolated from the Cycling pedal by the Vibration isolation mounts.

In another embodiment, one could use the mechanical power from the spinning rotation of the pedal to produce the spinning rotation of an eccentric mass about a shaft connected to the pedal and therefore producing vibrating oscillations. Rotation speed can be determined by a gear.

In yet another embodiment, the spinning rotation of the pedal as shown in FIGS. 2-3 can be used to drive the rotations of magnets whose attracting-repelling force can be used to produce oscillating vibrations. The oscillating potential energy produced by the relative magnets' rotation can also be exploited to produce a modulated resistance to pedal rotation, resulting in additional vibration effects to the user. Magnets' rotations can also be combined as to produce a modulated braking action, also resulting in vibration effects for the user. The use of a gear can again be envisaged to adjust the rotation speeds and achieve the required vibration frequency given the typical round-per-minute of the pedal about its axis. Alternatively, to the use of static magnets, the vertical attraction-repelling force can be generated by an electromagnet (linear motor or solenoid) powered by the electrical generator in FIG. 2.

Figure 4:
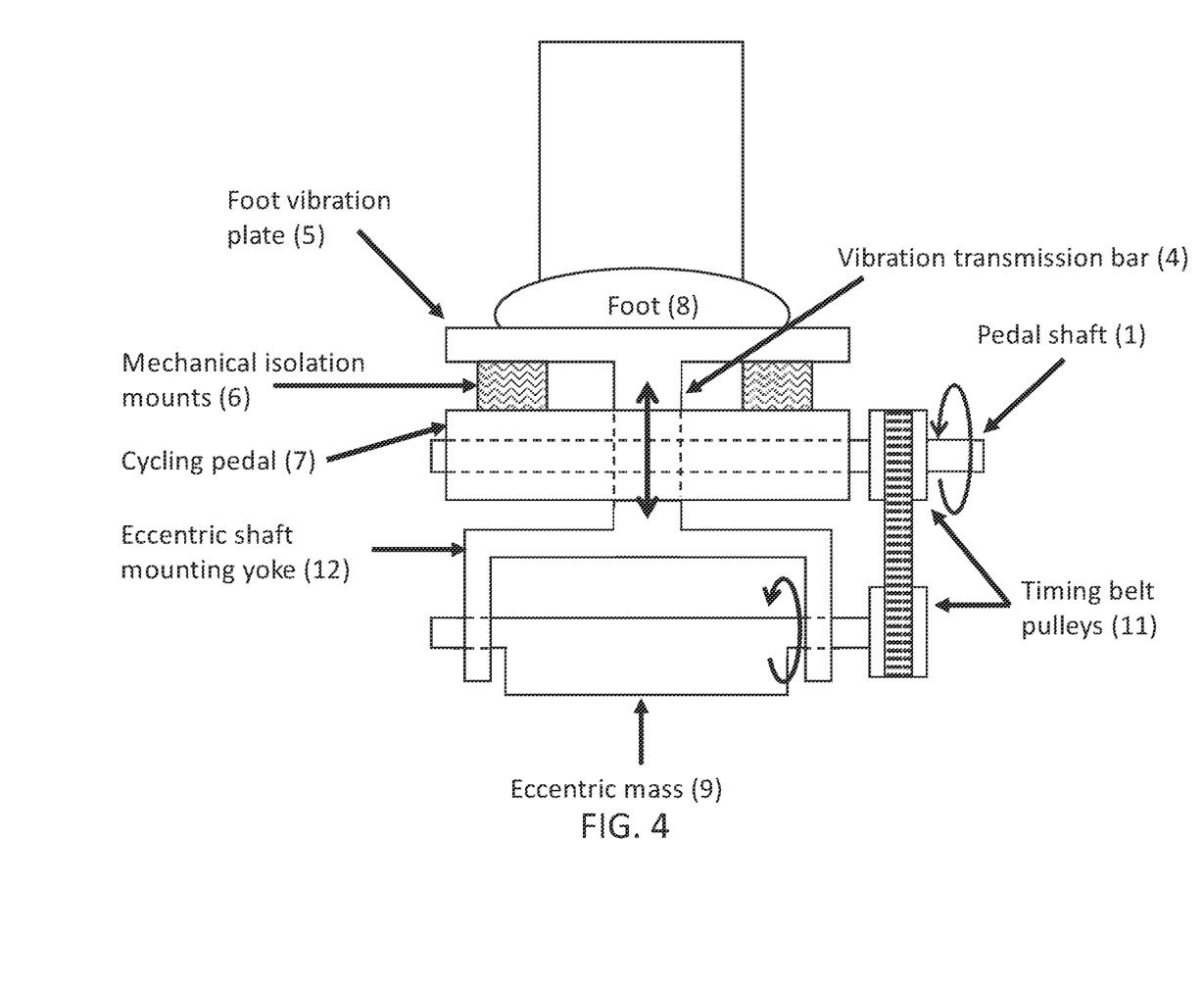
FIG. 4 shows a self-powered vibration device according to an exemplary embodiment of the invention whereby eccentric rotation are achieved without involvement of electrical components.

In a different embodiment (FIG. 4), eccentric rotation can also be achieved without involvement of electrical components. The mechanical power from the spinning rotation of the cycling pedal (7) about the pedal shaft (1) can be transferred through the timing belt pulleys (11) to generate the spinning rotation of the eccentric mass (9), therefore generating a vibrating force that is transmitted through the eccentric shaft mounting yoke (12) and the vibration transmission bar (4) to the foot vibration plate (5). The rotation speed can be determined by varying the ratio between the timing belt pulleys, for instance by a gear system.

Figure 5:
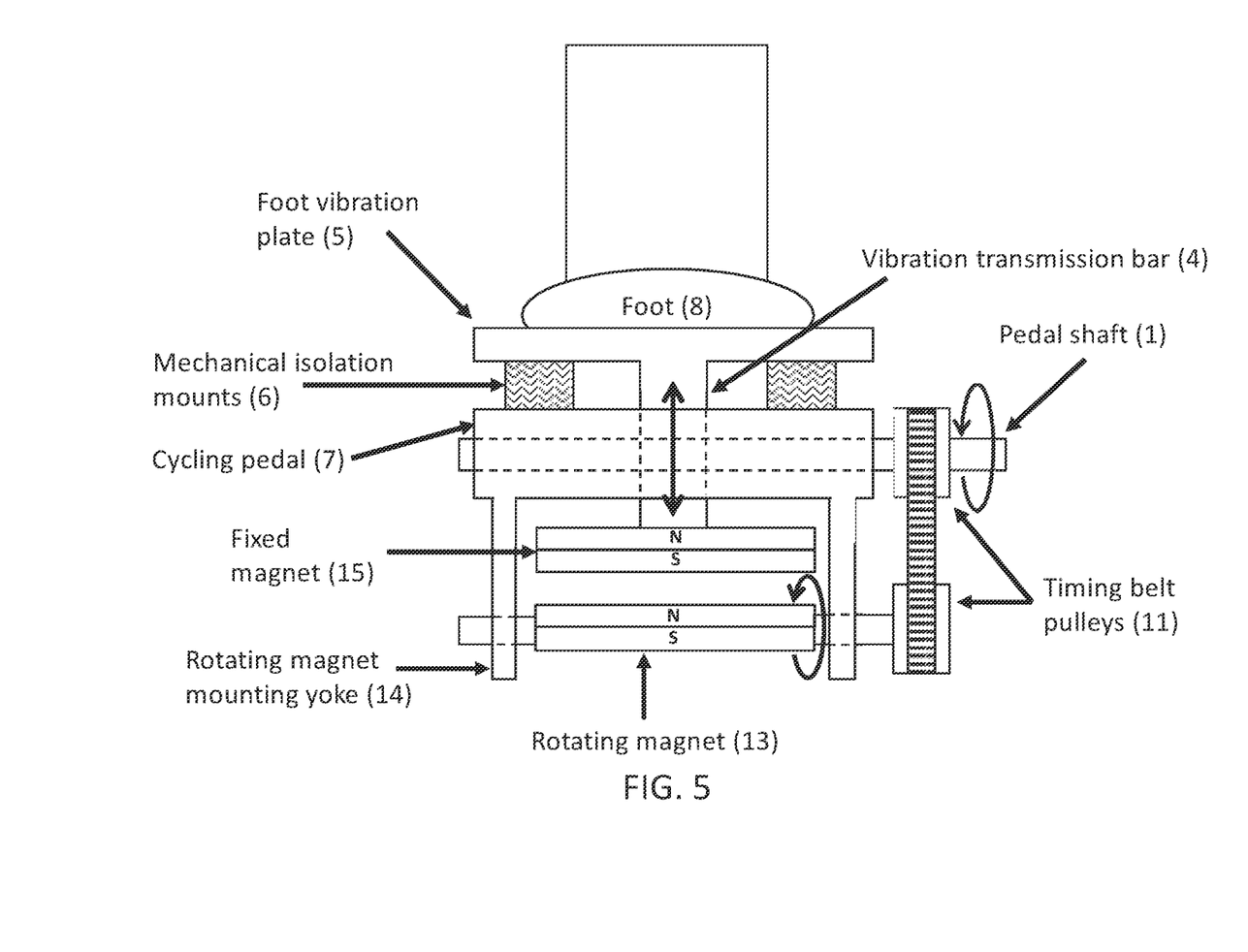
FIG. 5 shows a self-powered vibration device according to an exemplary embodiment of the invention whereby the spinning rotation of the pedal is used to drive rotations of magnets whose attracting-repelling force can be used to produce oscillating vibrations to the footplate.

In yet another embodiment (FIG. 5), the spinning rotation of the pedal as in the other embodiments can be used to drive rotations of magnets whose attracting-repelling force can be used to produce oscillating vibrations to the footplate. The spinning rotation of the cycling pedal (7) about the pedal shaft (1) can be transferred through the timing belt pulleys (11) to generate the spinning rotation of the rotating magnet (13), whose rotation is guided by the rotating magnet mounting yoke (14). Depending on the orientation of the magnet polarity, the rotating magnet will apply an oscillating attractive-repelling force to the fixed magnet (15). This will generate a vibrating force that is transmitted via the vibration transmission bar (4) to the foot vibration plate (5), which is mechanically isolated from the cycling pedal (7) by the mechanical isolation mounts (6).

Figure 6:
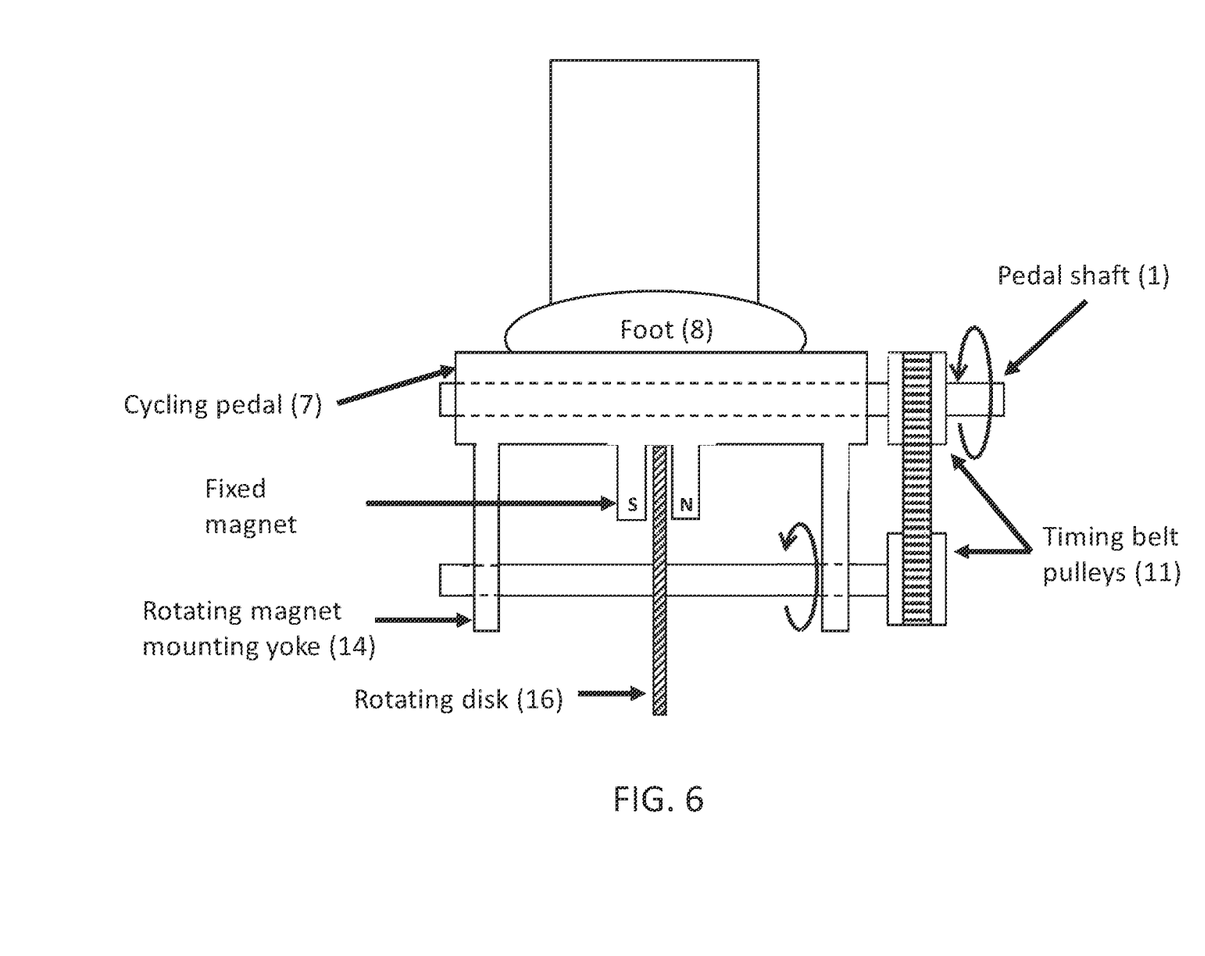
FIG. 6 shows a self-powered vibration device according to an exemplary embodiment of the invention whereby the use of a gear can adjust the rotation speeds and achieve the required vibration frequency given the typical round-per-minute of the pedal about its shaft.

Magnets' rotations can also be combined to produce a modulated braking action, also resulting in vibration effects for the user. Braking magnets can also have electromagnets, which can be driven by the electrical current generated by the generating motor in FIGS. 2-3. Both magnetic and electromagnetic brakes can modulate the resistance to the cycling pedal rotation about its own shaft. The resulting vibration will therefore have the oscillation of the pedal about its own shaft. The use of a gear can again be envisaged to adjust the rotation speeds and achieve the required vibration frequency given the typical round-per-minute of the pedal about its shaft. A schematic representation of this additional embodiment is provided in FIG. 6. The spinning rotation of the cycling pedal (7) about the pedal shaft (1) can be transferred through the timing belt pulleys (11) to generate the spinning rotation of a disk (16), whose rotation is guided by the rotating magnet mounting yoke (14). The disk can be designed with magnetic properties such that its rotation through the fixed magnet results in an oscillating braking action, which will modulate the resistance to the rotation of the cycling pedal (7) about the pedal shaft (1).

What is claimed is:

1. A self-powered vibration device for mounting to a cycling pedal connected to a pedal axle, comprising:
    an electrical generator with a rotatable generator shaft, wherein the rotatable generator shaft rotation is configured to be driven by a rotation of the cycling pedal, and wherein the rotatable generator shaft rotation generates power for the electrical generator;
    an electrical motor powered by the electrical generator;
    a source of vibration force coupled to the electric motor;
    a vibration plate that is configured to be mechanically vibrated by the source of vibration;
    a transmission bar coupling the source of vibration to the vibration plate; and
    mechanical isolation mounts, separate from the transmission bar, joining the vibration plate to the cycling pedal such that the vibration plate moves relative to the cycling pedal and is capable of mechanically vibrating a body part of a person while in contact with the vibration plate.

2. The self-powered vibration device as set forth in claim 1, wherein the source of vibration comprises an eccentric shaft, and wherein the electrical motor rotates the eccentric shaft.

3. The self-powered vibration device as set forth in claim 2, wherein the rotation of the eccentric shaft is adjustable through a motor-driver control unit.

4. The self-powered vibration device as set forth in claim 2, wherein the rotation of the eccentric shaft is adjustable through a pulse-width modulation.

5. The self-powered vibration device as set forth in claim 1, wherein the electrical generator is mounted on the cycling pedal.

6. The self-powered vibration device as set forth in claim 1, further comprising a control unit to control a rotation speed of the electrical motor based on physiological parameters measured by one or more sensors.

7. The self-powered vibration device as set forth in claim 1, further comprising one or more sensors to measure physiological parameters from the person, wherein measurements from the one of more sensors are used to control the mechanical vibrations of the vibration plate.

8. The self-powered vibration device as set forth in claim 1, wherein the mechanical vibrations of the vibration plate are in the order of 20-50 Hz.

9. The self-powered vibration device as set forth in claim 1, wherein the rotatable generator shaft is connected to the cycling pedal via pulleys.

10. The self-powered vibration device as set forth in claim 1, wherein the self-powered vibration device and the cycling pedal are an integral unit.

11. The self-powered vibration device as set forth in claim 1, wherein the self-powered vibration device is a self-standing device which is adapted to be integrated with the cycling pedal.

12. The self-powered vibration device as set forth in claim 1, wherein the device and the cycling pedal are configured as a single unit configured to replace an existing pedal.

13. The self-powered vibration device as set forth in claim 1, wherein the source of vibration comprises one or more rotatable magnets magnetically used to move the transmission bar, and wherein the electrical motor rotates the one or more rotatable magnets.

14. A self-powered vibration device for mounting to a cycling pedal connected to a pedal axle, comprising:
    an electrical generator with a rotatable generator shaft, wherein the rotatable generator shaft rotation is configured to be driven by a rotation of the cycling pedal, and wherein the rotatable generator shaft rotation generates power for the electrical generator;
    an electrical motor powered by the electrical generator;
    a vibration plate that is configured to be mechanically vibrated by the electrical motor; and
    mechanical isolation mounts joining the vibration plate to the cycling pedal such that the mechanical isolation mounts support the vibration plate on the cycling pedal and support the electrical motor on the cycling pedal through the vibration plate while the vibration plate moves relative to the cycling pedal and is capable of mechanically vibrating a body part of a person while in contact with the vibration plate.

15. The self-powered vibration device as set forth in claim 14, further comprising one or more sensors to measure physiological parameters from the person, wherein measurements from the one or more sensors are used to control the mechanical vibrations of the body part of the person.

16. The self-powered vibration device as set forth in claim 14, wherein the mechanical vibrations of the vibration plate are in the order of 20-50 Hz.

17. A self-powered vibration device for mounting to a cycling pedal connected to a pedal axle, comprising
   a vibration generating assembly comprising:
      a vibrating element driven by an electromagnet;
      an electrical generator with a rotatable generator shaft, wherein the rotatable generator shaft rotation is configured to be driven by a rotation of the cycling pedal and the electrical generator is electrically coupled to the electromagnet;
      a vibration plate connected to the vibrating element to move relative to the cycling pedal and thereby mechanically vibrating a body part of a person while in contact with the vibration plate; and
      a transmission bar coupling the vibrating element to the vibration plate; and
   mechanical isolation mounts supporting the transmission bar and the vibration plate on the cycling pedal and mechanically isolating the vibration plate and from the cycling pedal to allow the movement of the vibration plate relative to the cycling pedal.

18. The self-powered vibration device as set forth in claim 17, wherein the vibration plate is mechanically vibrated by attracting-repelling force produced by the electromagnet.

19. The self-powered vibration device as set forth in claim 17, further comprising one or more sensors to measure physiological parameters from the person, wherein measurements from the one or more sensors are used to control the mechanical vibrations of the vibration plate.

20. The self-powered vibration device as set forth in claim 17, wherein the vibrating element is rotatable.

* * * * *